INVENTOR
James Robert Dieckmann
BY  W. A. Fraser
ATTORNEY

Aug. 15, 1961   J. R. DIECKMANN   2,996,107
APPARATUS FOR FORMING TIRE BEAD GROMMETS
Filed Dec. 3, 1956   7 Sheets-Sheet 2

INVENTOR
James Robert Dieckmann
BY *W. A. Fraser*
ATTORNEY

Aug. 15, 1961 J. R. DIECKMANN 2,996,107
APPARATUS FOR FORMING TIRE BEAD GROMMETS
Filed Dec. 3, 1956 7 Sheets-Sheet 3

INVENTOR
James Robert Dieckmann
BY W. A. Fraser
ATTORNEY

Aug. 15, 1961  J. R. DIECKMANN  2,996,107
APPARATUS FOR FORMING TIRE BEAD GROMMETS
Filed Dec. 3, 1956  7 Sheets-Sheet 4
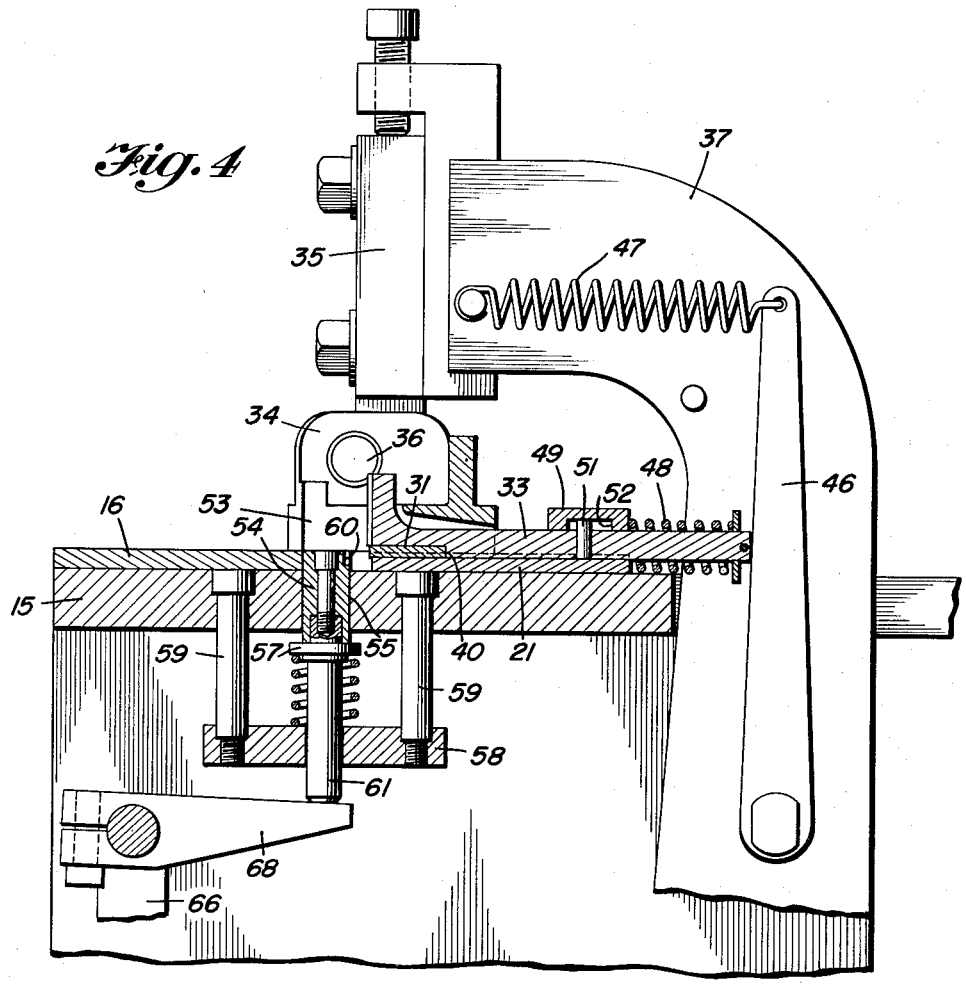
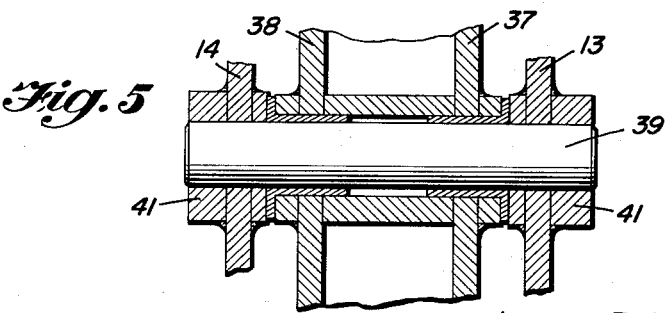
INVENTOR
James Robert Dieckmann
BY W. A. Fraser
ATTORNEY Aug. 15, 1961  J. R. DIECKMANN  2,996,107
APPARATUS FOR FORMING TIRE BEAD GROMMETS
Filed Dec. 3, 1956  7 Sheets-Sheet 5
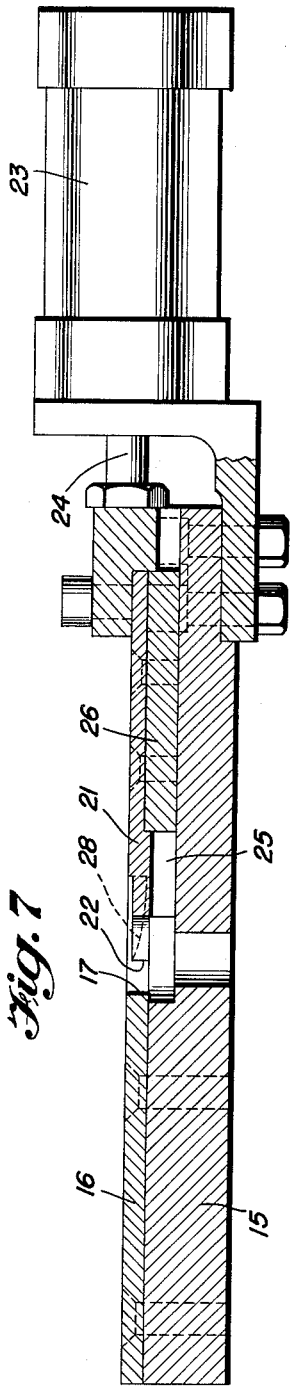
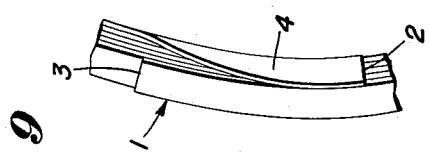
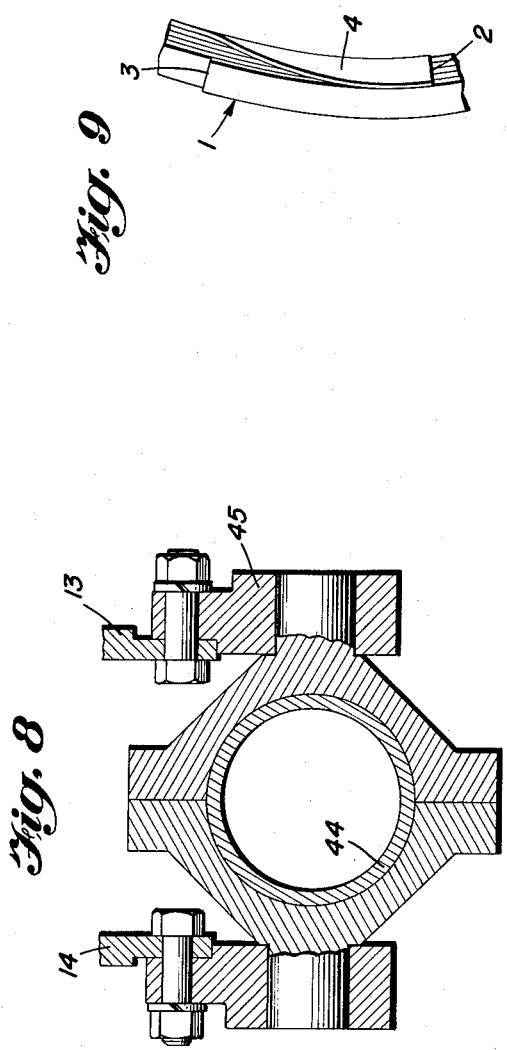
INVENTOR
James Robert Dieckmann
BY  W. A. Fraser
ATTORNEY

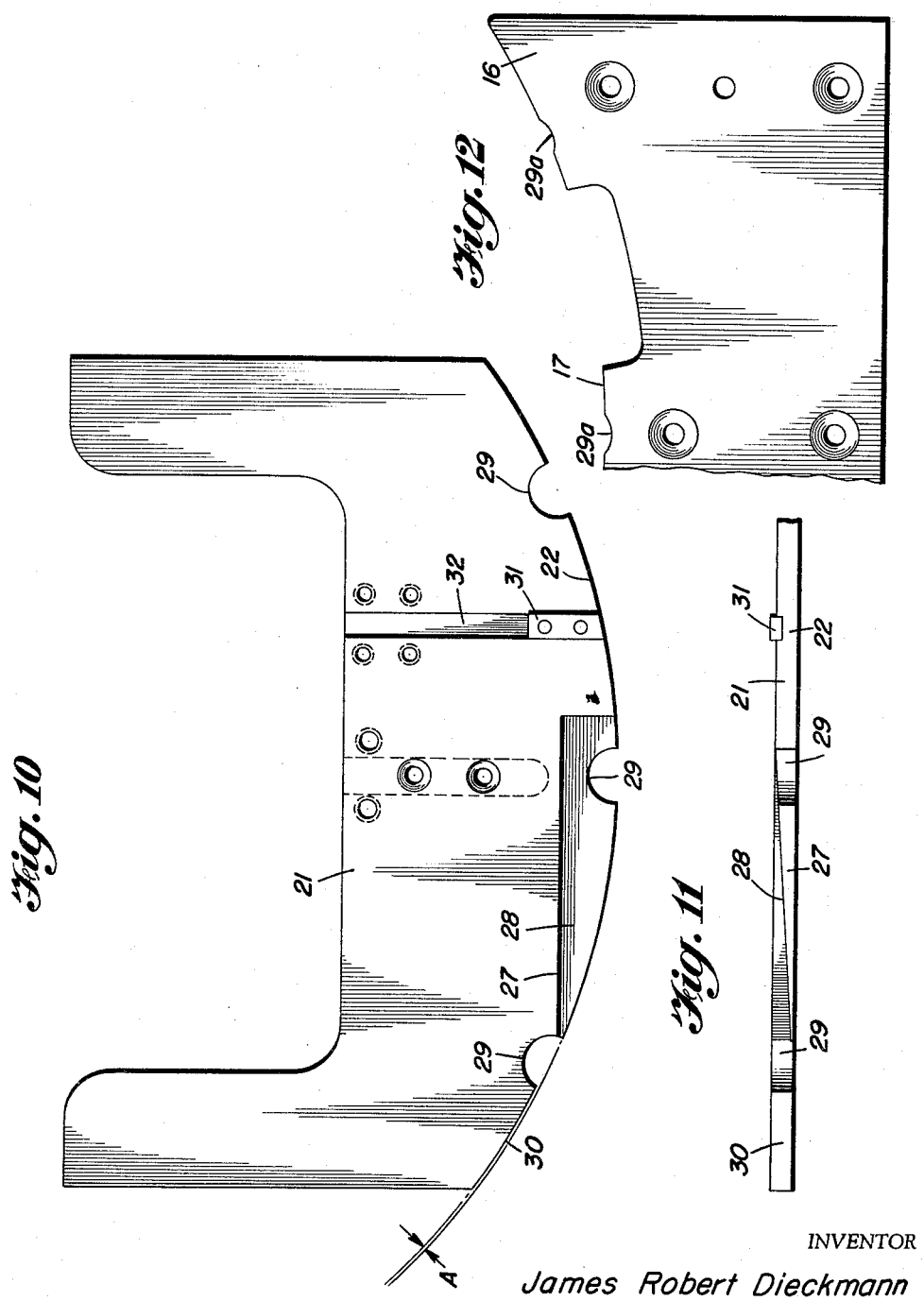

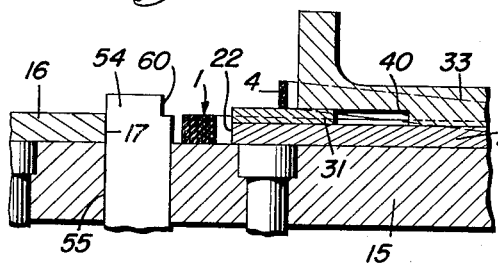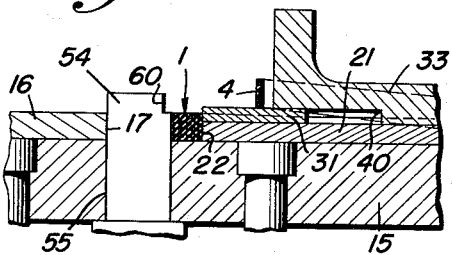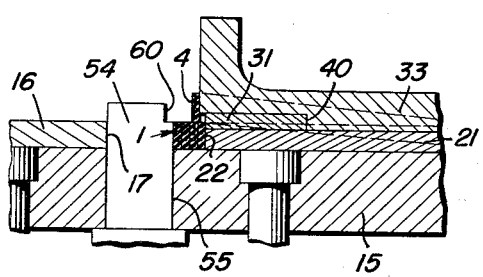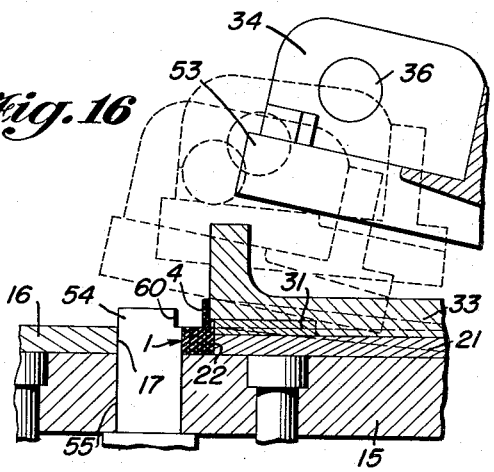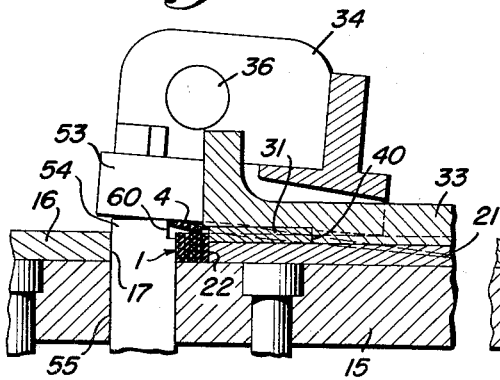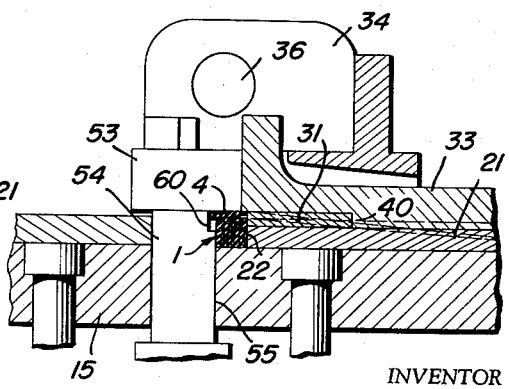
INVENTOR
James Robert Dieckmann
BY W. A. Fraser
ATTORNEY United States Patent Office 2,996,107
Patented Aug. 15, 1961

2,996,107
APPARATUS FOR FORMING TIRE BEAD GROMMETS
James Robert Dieckmann, Cuyahoga Falls, Ohio, assignor to The Firestone Tire & Rubber Company, Akron, Ohio, a corporation of Ohio
Filed Dec. 3, 1956, Ser. No. 625,784
5 Claims. (Cl. 154—9)

This invention relates to the construction of tire bead grommets and, more particularly, to the formation of lap joints on the side of such grommets.

Pneumatic vehicle tires are commonly provided with substantially inextensible wire grommets usually formed of high carbon steel to reinforce the bead portions of the tire. It is common practice to construct such grommets by passing a number of closely spaced parallel wires in the same plane through an extruder which places a coating of rubber around and between the wires to form a flat ribbon. This ribbon is wound flat upon itself on a building ring until a plurality of convolutions are built up to form a grommet having the desired thickness and tensile strength.

The increase in rate of acceleration and braking power of modern automobiles has resulted in a greater tendency for the tire beads to slip relative to the rim on which they are mounted. To prevent such undesirable slippage, tire manufacturers have reduced the clearance between the tire beads and the rims in some cases to zero and others to a negative clearance. This tendency toward a tighter fit of the tire beads to the rim is expected to become accelerated with the increased use of tubeless tires.

It has developed that, in tires of the type now in common use, the bead reinforcing wires frequently become broken at or near the splice at the inner terminal end of the ribbon when the tire bead is forced on to the rim bead seat during mounting of the tire. Such breaking is especially prevalent when the spliced portion of the grommet is the last portion to be seated on the rim. As set forth in the co-pending Robson application, Serial No. 501,153, entitled "Tire Bead Construction," now Patent No. 2,822,141, the amount of breaking is materially decreased when the splice or lap joint is located other than on the radially inner surface of the bead grommet. This co-pending application describes such a bead grommet wherein the lap joint at the end of the inner terminal portion of the ribbon is formed on the side of the grommet.

It is an object of this invention to provide an apparatus for rapidly and efficiently forming a lap joint on the side of a tire bead grommet constructed of spirally wrapped ribbon by bending the unattached inner terminal portion of the ribbon and attaching it flatwise against the side of the grommet while retaining it in a clamping device.

It is a further object of this invention to provide a press for evenly forming an undistorted side lap joint on such a spirally wrapped tire bead grommet.

It is a further object of this invention to provide an improved method of forming such spirally wrapped tire bead grommets wherein an even lap joint is formed on the side thereof by the application of pressure while fully supporting the grommet to prevent distortion.

Broadly, the apparatus of this invention includes a device for forming a lap joint on the lateral side of an annular tire bead grommet constructed of a flat ribbon wound upon itself in a plurality of convolutions with the inner terminal portion of the ribbon being free and unattached to the inner surface of the adjacent convolution which comprises a clamping device for retaining the grommet and means for bending the unattached inner terminal portion of the ribbon and attaching it flatwise against the lateral side of the grommet while the grommet is retained in the clamping device.

In general, the invention is especially adapted for forming a side lap on a grommet fabricated of a warm tacky ribbon of reinforced unvulcanized rubber. Preferably, the inner terminal portion of the ribbon is attached to the side of the grommet by a pressing operation. To prevent distortion of the grommet during the pressing operation, it is desirable to support an arcuate segment of the bead grommet in which the inner terminal portion is located on substantially the entire surface of (1) the side of the grommet opposite to the side on which the joint is to be formed and (2) the radially inner and outer walls of the grommet. The side support is provided by a table having a surface on which the grommet is mounted. The radial support is provided by arcuate gripping surfaces on the jaws of a clamping device, which jaws are movable relative to one another to engage the grommet between the arcuate gripping surfaces. To enable pressure to be applied to the unsupported side of the grommet while the radially inner and outer walls thereof are fully supported, the height of each of the arcuate gripping surfaces is preferably substantially equal to the width of the bead grommet. The inner terminal portion of the grommet is maintained free of the gripping surfaces in order that the joint might be formed. This is accomplished by providing a recess in the inner gripping surface and means to support the inner terminal portion laterally extended from the unsupported side of the grommet. This free laterally extended inner terminal portion of the ribbon must be positioned flatwise against the unsupported side of the bead grommet. A preferred means for accomplishing this comprises an inclined press plate facing downwardly and radially outwardly of the grommet. The press plate is progressively pivoted to a position parallel to the plane of the side surface of the grommet while being moved outwardly and downwardly against the laterally extended terminal portion of the ribbon. This action bends the terminal portion over and positions it flatwise against the unsupported side of the grommet. More accurate positioning of the ribbon prior to the bending operation may be achieved by an outwardly movable push bar which moves the end of the ribbon to a position overlying the unsupported side of the bead grommet. In order that the press plate may descend over the push bar without obstruction, the press plate is slotted to receive the push bar. When the terminal portion of the ribbon is fully positioned flatwise against the unsupported side of the grommet, pressure is applied thereto by the press plate with sufficient force and for a sufficient time to cause the tacky ribbon to adhere to the side of the bead grommet to form the completed side lap joint. Preferably, the various moving elements of the apparatus are actuated in a predetermined timed sequence and an ejector is provided to remove the finished grommet.

The invention also contemplates a method of making a tire bead grommet comprising winding a tacky ribbon of heated reinforced rubber-like material upon itself to form an annulus consisting of a plurality of convolutions with a terminal portion of the ribbon on the radially inside surface free and unattached to the adjacent convolution which comprises the steps of supporting an arcuate segment of said grommet on substantially the entire surfaces of (1) one side thereof, and (2) the radially inner and outer walls thereof, supporting said terminal portion in a position laterally extended from the side of said grommet opposite to the supported side, positioning said laterally extended terminal portion flatwise against said opposite side of the grommet, and pressing said side positioned terminal portion against said grommet while maintaining the support of said surfaces of the arcuate segment, the pressure being of sufficient force maintained for a sufficient time to cause said terminal portion to adhere to said opposite side of the grommet.

The stated objects and others will be apparent from the following description with reference to the drawings in which:

FIGURE 4 is a fragmentary sectional view taken in the direction of the arrows along the lines 4—4 of FIGURE 2;

FIGURE 5 is a fragmentary sectional view taken in the direction of the arrows along the lines 5—5 of FIGURE 1;

FIGURE 7 is a sectional view taken in the direction of the arrows along the lines 7—7 of FIGURE 2;

FIGURE 8 is a detailed sectional view taken in the direction of the arrows along the lines 8—8 of FIGURE 1;

FIGURE 9 is a perspective view of a bead grommet having a side lap joint formed in accordance with the invention;

FIGURE 10 is a plan view showing the movable clamp plate in detail;

FIGURE 11 is a fragmentary front view of the movable clamp plate;

FIGURE 12 is a fragmentary plan view of a portion of the stationary clamp plate; and FIGURES 13 to 18, inclusive, are fragmentary sectional views taken in the same plane as FIGURE 4 and showing a succession of steps by which a side lap joint is formed in accordance with the invention.

The invention having been generally set forth, a preferred specific embodiment will now be described in detail.

The method and apparatus of this invention are used to form a lap joint on the side of a tire bead grommet 1 as illustrated in FIGURE 9. The grommet is fabricated on a building ring by winding upon itself a continuous flat ribbon in a plurality of convolutions. The ribbon has an inner end 2 and an outer end 3. As shown in FIGURE 13, the ribbon is composed of a plurality of spaced parallel reinforcing wires which lie in the ribbon in a common plane and are covered with a coating of rubber. At the winding or plying-up stage of the fabrication of the grommet, the insulating rubber is unvulcanized and hot so as to be sufficiently tacky to adhere to itself. When the grommet is wrapped, five to six inches of the inner terminal portion 4 of the ribbon remain unadhered to the adjacent ply with a permanent bend or set imparted to the terminal portion so that it remains away from and out of contact with the adjacent ply. In the finished grommet, the inner terminal portion 4 is attached flatwise to the side of the grommet as shown.

The apparatus of the invention is mounted upon a supporting frame comprising a plurality of supporting and bracing members which are shown and described only to the extent necessary for a complete understanding of the invention.

Figure 1:
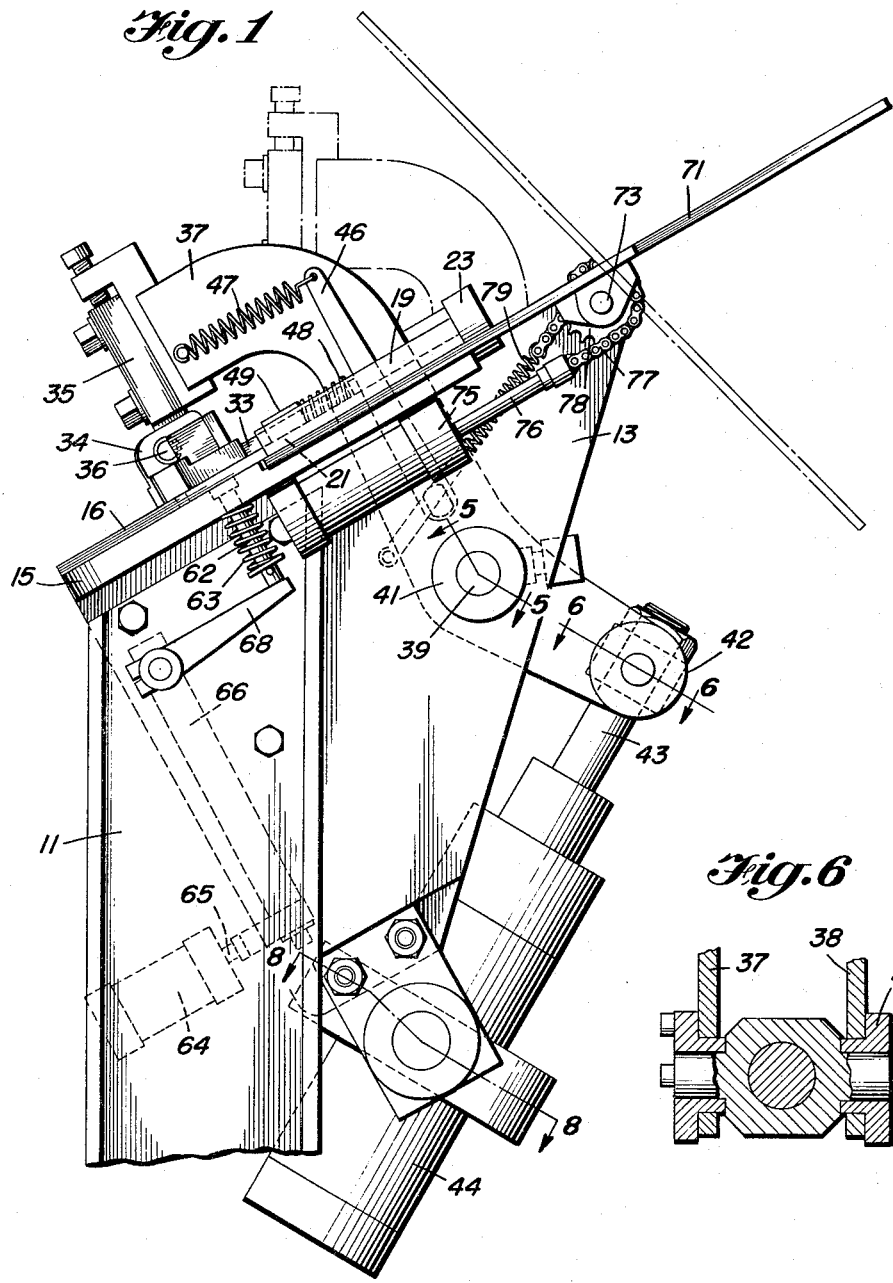
FIGURE 1 is a fragmentary side elevational view of the apparatus of the invention.
Figure 2:
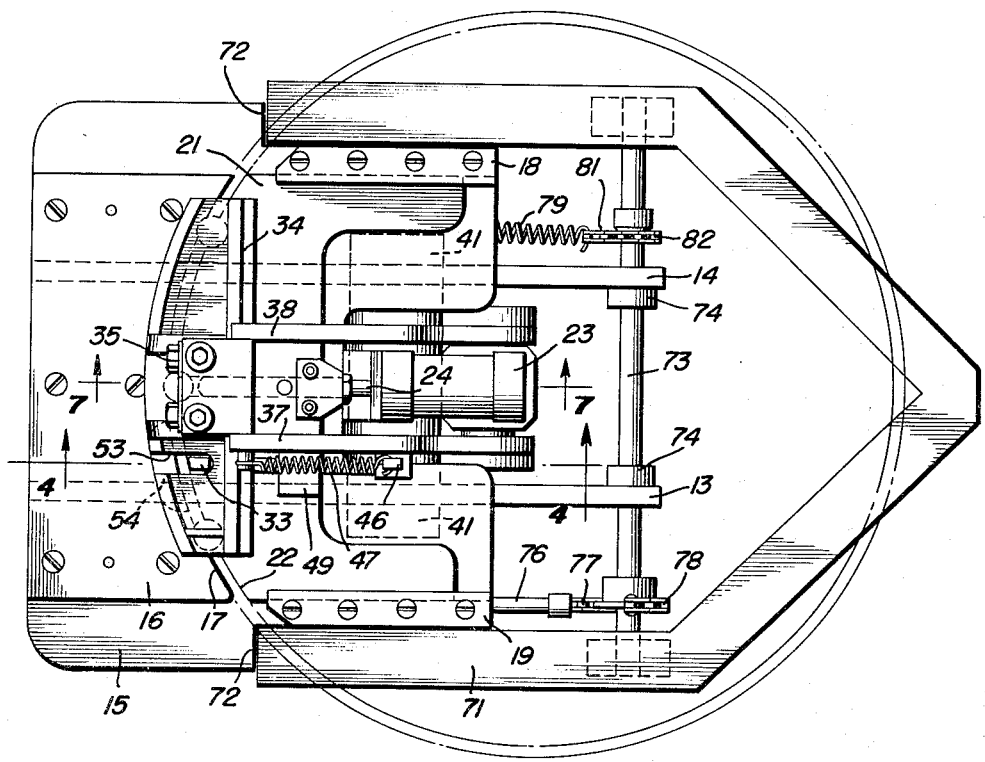
FIGURE 2 is an auxiliary view of the apparatus of the invention taken parallel to the bead supporting table.
Figure 3:
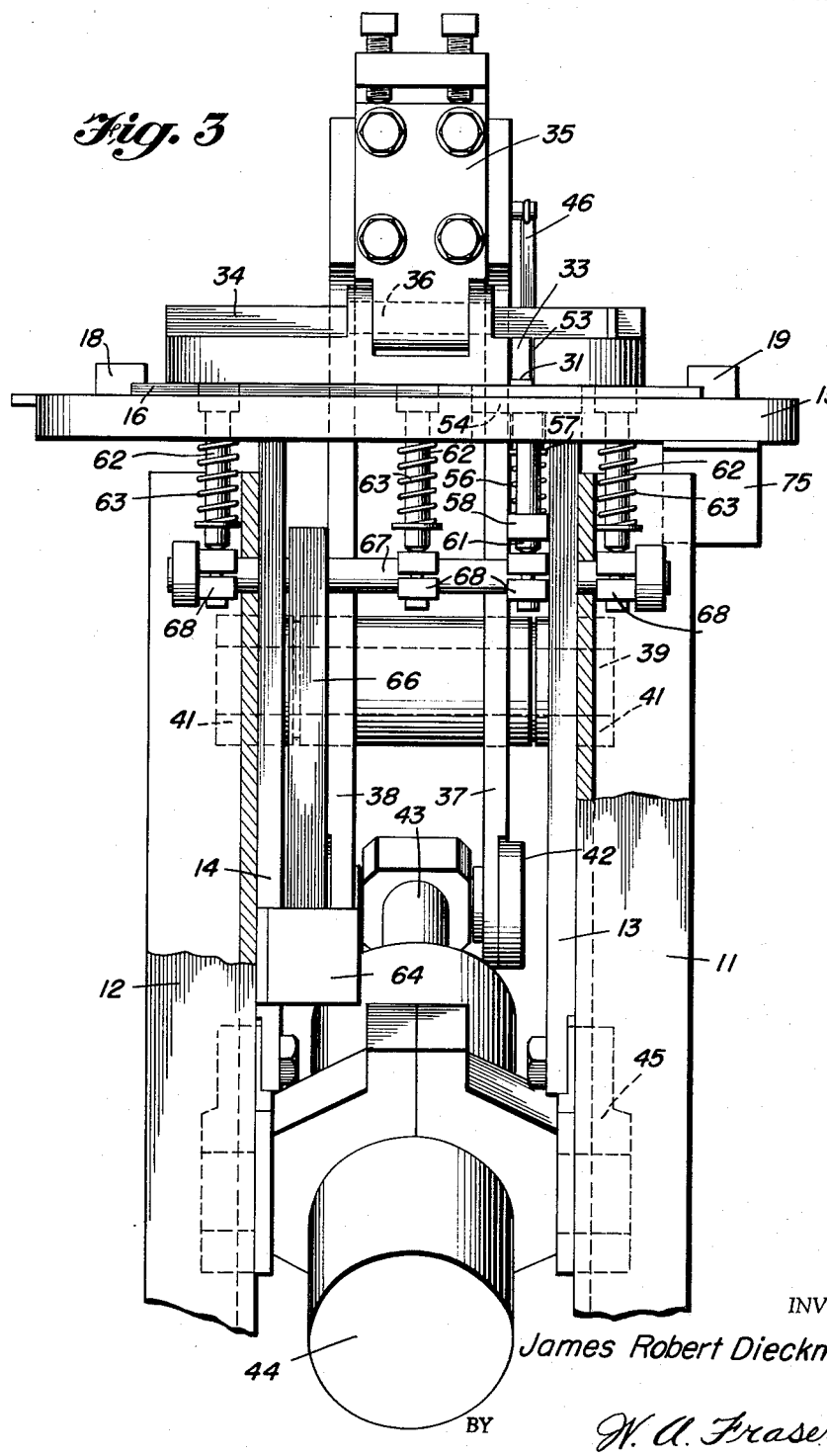
FIGURE 3 is an auxiliary view partially in section taken in a direction normal to FIGURE 2.

With particular reference to FIGS. 1, 2 and 3, a pair of vertical channel members 11 and 12 are spaced apart in back-to-back relationship. Bolted to the backs of the channels 11 and 12 respectively are a pair of supporting side plates 13 and 14. Mounted on the top edges of side plates 13 and 14 and preferably welded thereto is a grommet supporting table 15. Bolted to the top of table 15 is a flat stationary plate 16 having an arcuate face 17. A pair of grooved blocks 18 and 19 bolted to the top of table 15 serve as trackways for a movable plate 21 having an arcuate face 22 substantially concentric with arcuate face 17. Preferably, the height of the arcuate faces 17 and 22 is substantially equal to the width of the bead grommet ribbon. An additional trackway is provided by a groove 25 (FIG. 7) in table 15 underlying the center of plate 21. The groove 25 slideably receives a narrow guide block 26 bolted to the bottom of plate 21. Reciprocating movement may be imparted to the movable plate 21 by means of a fluid pressure cylinder 23 bolted or otherwise connected to the bottom of table 15. A piston rod 24 actuated by cylinder 23 is bolted or otherwise connected to the movable plate 21 as shown in FIGURE 7. The plates 16 and 21 form the clamping jaws of a vise adapted to receive a tire bead grommet in gripping relationship between the arcuate faces 17 and 22, the grommet being laterally supported by the top surface of table 15.

Adjacent one side of the movable plate 21, a short portion of the face 22 is off-set radially inwardly of the rest of the face 22 a distance A (FIG. 10) equal to the thickness of one layer of the bead grommet ribbon. This off-set portion of the face is designated by the reference numeral 30. A recess 27 in the arcuate face 22 extends laterally from the end of the off-set portion 30 toward the center of the movable plate 21. The recess 27 has an inclined bottom surface 28 (FIGS. 7 and 10) facing upwardly and laterally toward the off-set portion 30. A groove 32 is provided in the upper surface of the plate 21 extending from the inner edge to the outer edge thereof. A bearing block 31 is mounted in the outer end of groove 32. When a bead grommet 1 is properly oriented on the table 15 in the space between the arcuate faces 17 and 22 (FIG. 13), the terminal portion 4 of the ribbon is received in the recess 27 and extends up the inclined surface 28. The extreme end 2 of the ribbon rests on or just beyond the bearing block 31. The off-set portion 30 receives the innermost layer of ribbon which terminates at the end 2, thus permitting uniform gripping force to be applied throughout the periphery of the arcuate gripping faces of the clamping device. In addition, three spaced arcuate recesses 29 (FIG. 10) are provided in the face 22 to receive ejector pins more fully described hereinafter.

Figure 6:
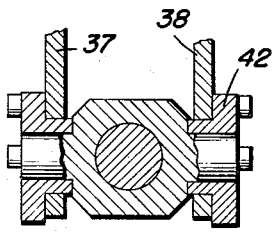
FIGURE 6 is a fragmentary sectional view taken in the direction of the arrows along the lines 6—6 of FIGURE 1.

The portion of the groove 32 inwardly of the bearing block 31 forms a trackway for a push bar 33 (FIG. 4) slideably received therein. A shoulder 40 on the bottom of push bar 33 forms a stop which engages the inner end of bearing block 31 to limit the outward movement of the push bar so that its outermost face extends to a point slightly beyond the outer edge of the bearing block 31. A press block 34 adapted to engage the top surfaces of plates 16 and 21 across the arcuate space therebetween is pivotally mounted on the bottom of adjustable press head 35 by means of pin 36. As shown in FIGURE 4, the pin 36 is eccentrically located with respect to press block 34 so that the heavier portion of the press block lies inwardly of the pin. Accordingly, the press block normally occupies an inclined position with the bottom of the block facing outwardly as shown in FIGURE 16. Adjustable head 35 is fixed to the ends of main press arms 37 and 38 which are rigidly mounted on pin 39 which, in turn, is journaled between bearings 41 in side plates 13 and 14 as shown in FIGURE 5. The ends of the main press arms 37 and 38 opposite to the press head 35 are connected by a suitable connection 42, shown in FIGURE 6, to the end of piston rod 43 which is actuated by fluid pressure cylinder 44. Cylinder 44 is fixed by suitable connections 45, shown in FIGURE 8, to the lower ends of side plates 13 and 14.

As the main press arms 37 and 38 pivot about the pin 39 so that the upper ends of the arms move outwardly, the press block 34 approaches the plate 21 along an arcuate path. The inner edge of press block 34 first contacts the plate 21 and forms a fulcrum about which the press block pivots as it descends. The press plate moves downwardly and outwardly as it aproaches the position of final engagement with the plates 16 and 21 as illustrated in FIGURE 16.

When the upper end of the main press arm 37 is moved outwardly, a lever 46 which is carried thereby engages the inner end of push bar 33 and moves it outwardly, as shown in FIGURE 4. The lower end of lever 46 is pivotally connected to main press arm 37 and the upper end is biased outwardly toward push bar 33 by spring 47. Push bar 33 is biased inwardly toward lever 46 by a coil spring 48 which bears against the end of bracket 49 which in turn is mounted on movable plate 21 to slidably receive the push bar 33. The inward movement of push bar 33 is limited by the engagement of pin 51, mounted therein, with shoulder 52 on the bottom of bracket 49. Excess movement of the main press arm 37 is absorbed by expansion of spring 47. A slot 53 in press block 34 receives the upstanding outer head of push bar 33, thus permitting the press plate to descend to the surface of the plates 16 and 21.

A generally crescent-shaped backup block 54 is slideably received in a slot 55 in table 15. The inner face of the backup block coincides with the arcuate face 17 of plate 16. Backup block 54 is biased upwardly by spring 56 positioned between a flange 57 on the backup block and an underlying plate 58 spaced below table 15 and connected thereto by means of bolts 59. A stem 61 connected to the flange 57 of the backup block extends downwardly through a suitable opening in the plate 58. A recess 60 is formed in the top of backup block 54 along the inner edge thereof. If desired, the recess may extend laterally along the entire edge of the backup block. This recess 60 is aligned with the bearing block 31 and push bar 33 and extends downwardly at least as far as the plane of the upper surface of the plate 21 when the backup block is in its uppermost position.

The table 15 is drilled to slideably receive three ejector pins 62 which are normally biased downwardly by compression springs 63. The ejector pins 62 are circumferentially spaced along the arcuate space between plates 16 and 21 which are provided with suitable recesses 29 and 29a to receive the ejector pins. If desired, pins may be used which are sufficiently small in diameter to eliminate the necessity for these recesses. Upward movement is imparted to the backup block 54 and ejector pins 62 by fluid pressure cylinder 64 through a suitable linkage consisting of piston rod 65, link 66, shaft 67 and fingers 68. The link 66 and fingers 68 are non-rotatably mounted on shaft 67 which is rotatably supported between channels 11 and 12. As best seen in FIGURE 3, a finger 68 contacts each of the ejector pins 62 and the stem 61 of backup block 54.

A bifurcated ejector plate 71 normally rests in a pair of slots 72 on opposite sides of the upper surface of table 15 and is rigidly connected to shaft 73 which is pivotally received in suitable bearings 74 in plates 13 and 14. Rotation is imparted to ejector plate 71 by means of fluid pressure cylinder 75 having a piston rod 76 to which is attached a chain 77 which extends around sprocket 78 which in turn is non-rotatably mounted on shaft 73. The ejector plate 71 is normally retained seated in the slots 72 by a tension spring 79 anchored to the frame and connected to a chain 81 which extends around sprocket 82 non-rotatably mounted on shaft 73.

In the operation of the apparatus, a tire bead grommet 1, as described hereinbefore, is positioned on the table 15 between the arcuate faces of the plates 16 and 21. The unadhered terminal portion 4 of the ribbon is received in the recess 27 and is retained in a laterally extended position by the inclined surface 28 and the bearing block 31. Next, fluid pressure is simultaneously introduced into one side of each of the cylinders 23 and 44. The cylinders are so designed, however, that the stroke of cylinder 23 is completed before that of cylinder 44. The action of cylinder 23 causes the movable plate 21 to slide into engagement with the grommet 1 as illustrated in FIGURE 14. Thus, the grommet is firmly clamped between the arcuate gripping faces 17 and 22. The action of cylinder 44 effects rotation of the main press arms 37 and 38 so that the upper ends thereof move outwardly. This causes the lever 46 to engage the end of push bar 33 and to move it against the force of spring 48 to a position slightly overhanging arcuate face 22 as illustrated in FIGURE 15. This moves the end portion of the ribbon to a position overlying the side of the bead grommet. When the push bar 33 engages bearing block 31, continued motion of the main press arm 37 is absorbed by expansion of spring 47. As the motion of the press arms continues, the innermost lower corner of press block 34 engages the plate 21. The press block pivots about such corner and moves outwardly and downwardly as shown in FIGURE 16 to engage the ribbon terminal portion 4 and bend it over flatwise against the side of the bead grommet as shown in FIGURES 17 and 18. The backup block 54 limits the outward movement of the edge of the bead ribbon and helps prevent the forward motion of the press block from distorting or smearing the end of the ribbon. As the press block 34 descends, the backup block is freely depressed. The recess 60 serves to receive any portion of the ribbon which extends over the edge of the bead ring as it is being spliced. Full pressure is applied by the press block 34 for a period of from about one to two seconds. During the application of pressure, the radially inner and outer surfaces of the bead grommet are supported by the arcuate faces 17 and 22 respectively and the lower side is laterally supported by the table 15. Thus, there can be no appreciable distortion of the bead grommet due to the pressure.

To reverse the cycle, fluid is introduced to the opposite side of cylinder 44 which rotates the main press arms 37 and 38 in the opposite direction. This raises the press block 34 and permits push bar 33 to be retracted through expansion of the spring 48 and backup block 54 to be raised to its normal position by action of the spring 56. Fluid is also introduced to the opposite side of cylinder 23 which retracts the movable clamp plate 21. After a short distance of travel of the main press arms 37 and 38, when the outer edge of the press plate 34 has cleared the inside periphery of the bead grommet, fluid is admitted to cylinder 64 which raises the ejector pins 62 to loosen the spliced portion of the bead grommet 1. Fluid is introduced into the cylinder 75 which, by retraction of the piston rod 76, causes rotation of the ejector plate 71 on shaft 73, thus throwing the spliced bead grommet off of the press onto a suitable ejector stand not shown.

Since adhesion of the various plies of the ribbon to each other is best accomplished when the bead is warm and tacky, the bead is either spliced when it is freshly wound and therefore still warm or after re-heating, preferably by means of radiant heat.

The entire operation of the apparatus is performed according to a predetermined time sequence. A source of fluid pressure is connected by conduits to the various fluid pressure cylinders of the apparatus. The flow of fluid to each of the cylinders may be controlled by a conventional system of valves. These valves may be actuated by a conventional pre-set timing mechanism. Alternatively, the valve actuating means may be controlled by switches suitably mounted on the frame to be sequentially tripped by the various moving elements of the apparatus as they perform their respective functions.

There has been illustrated and described what is considered to be a preferred embodiment of the invention. It will be understood that various modifications may be made without departing from the scope of the appended claims.

What is claimed is:
1. An apparatus for forming a lap joint on a side of an annular tire bead grommet constructed of a tacky, substantially inextensible ribbon of reinforced rubber wound upon itself in a plurality of convolutions with the inner terminal portion of said ribbon being free and unattached to the inner surface of the adjacent convolution comprising a frame; means providing a supporting surface for one side of said bead grommet; a clamping device mounted on said frame above said grommet supporting surface having relatively movable inner and outer jaws with mating gripping surfaces; means for moving one of said jaws relative to the other to engage said grommet between said gripping surfaces; means for positioning said unattached inner terminal portion in a laterally extended position overlying the side of said grommet opposite to the supported side; and means for bending the laterally extended terminal portion of said ribbon and pressing it flatwise against the side opposite said supported side of the tire bead grommet to cause it to adhere thereto.

2. An apparatus as recited in claim 1 wherein said bending and pressing means comprises a press block, and lever means pivotally mounted on said frame inwardly of said gripping surfaces, said press block being eccentrically pivoted on one end of the lever means such that said press block is normally tilted with the bottom surface thereof facing outwardly, said press block being movable outwardly and downwardly by said lever means.

3. An apparatus for forming a lap joint on the side of a tire bead grommet constructed of a wire reinforced rubber, substantially inextensible heated ribbon wound upon itself in a plurality of convolutions with the inner terminal portion of said ribbon being free and unattached to the inner surface of the adjacent convolution comprising a frame; means providing a surface for supporting one side of said bead grommet; vise means mounted on said frame having inner and outer clamping jaws with substantially concentric arcuate faces adapted to receive said bead grommet in gripping relationship therebetween, means to move one of said jaws relative to the other, said inner jaw having a recess with a floor inclined laterally upwardly from said supporting surface to support the inner terminal portion of said ribbon in a laterally extended position; a push bar slideably mounted for movement along the top of said inner jaw to move the laterally extended terminal portion of said ribbon radially outwardly to rest on the side of said grommet opposite the supported side; a press block; means mounted on said frame for moving said press block radially outwardly and downwardly to bend over the terminal portion of said ribbon and press it flatwise against the side opposite said supported side of the tire bead grommet whereby said terminal portion adheres to the adjacent convolution of said bead grommet.

4. An apparatus as recited in claim 3 wherein said press block has a slot on the bottom surface thereof to receive said push bar when said press block is in its lowermost position.

5. An apparatus as recited in claim 1 wherein said outer jaw is provided with a recess to receive any part of the inner terminal portion which extends over the edge of the grommet as it is pressed flatwise against and adhered to said opposite side.

References Cited in the file of this patent

UNITED STATES PATENTS

| | | |
|---|---|---|
| 360,623 | Siden | Apr. 5, 1887 |
| 445,808 | Beals | Jan. 20, 1891 |
| 775,143 | Lerol | Nov. 15, 1904 |
| 942,732 | Morford | Dec. 7, 1909 |
| 1,113,513 | Tyler et al. | Oct. 13, 1914 |
| 1,272,904 | Borbley | July 16, 1918 |
| 1,476,807 | Evans et al. | Dec. 11, 1923 |
| 1,633,620 | Alderfer | June 28, 1927 |
| 1,881,276 | Humphrey | Oct. 4, 1932 |
| 1,920,645 | Jones | Aug. 1, 1933 |
| 1,973,667 | Sleeper | Sept. 11, 1934 |
| 2,014,359 | Morrison | Sept. 10, 1935 |
| 2,049,587 | Lehman et al. | Aug. 4, 1936 |
| 2,083,350 | Shook | June 8, 1937 |
| 2,151,306 | Shook | Mar. 21, 1939 |
| 2,154,762 | McGregor et al. | Apr. 18, 1939 |
| 2,190,805 | Shook | Feb. 20, 1940 |
| 2,278,533 | Desautels | Apr. 7, 1942 |
| 2,279,507 | Wallis | Apr. 14, 1942 |
| 2,739,637 | Tyler | Mar. 27, 1956 |
| 2,740,458 | Wold | Apr. 3, 1956 |
| 2,822,141 | Robson | Feb. 4, 1958 |